US012353265B2

(12) United States Patent
Vandermeijden et al.

(10) Patent No.: US 12,353,265 B2
(45) Date of Patent: Jul. 8, 2025

(54) CLOSURE DETECTION FOR FOLDABLE DEVICES

(71) Applicant: Synaptics Incorporated, San Jose, CA (US)

(72) Inventors: Tom Vandermeijden, San Jose, CA (US); Samuel Toba, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 6 days.

(21) Appl. No.: 18/332,141

(22) Filed: Jun. 9, 2023

(65) Prior Publication Data

US 2023/0315187 A1 Oct. 5, 2023

Related U.S. Application Data

(63) Continuation of application No. 17/363,138, filed on Jun. 30, 2021, now Pat. No. 11,714,473.

(51) Int. Cl.
*G06F 1/3231* (2019.01)
*G06F 1/16* (2006.01)
*G06F 3/041* (2006.01)
*G06F 3/044* (2006.01)

(52) U.S. Cl.
CPC .......... *G06F 1/3231* (2013.01); *G06F 1/1677* (2013.01); *G06F 3/0418* (2013.01); *G06F 3/0446* (2019.05)

(58) Field of Classification Search
CPC ....... G06F 1/3231; G06F 1/1677; G06F 3/041
USPC .................................. 713/320; 345/173–174
See application file for complete search history.

(56) References Cited

U.S. PATENT DOCUMENTS

| 9,904,412 B2 | 2/2018 | Stevenson et al. |
| 10,712,862 B1 | 7/2020 | Kang et al. |
| 10,817,029 B1 * | 10/2020 | Files ............... G06F 1/1686 |
| 2007/0075965 A1 | 4/2007 | Huppi et al. |
| 2014/0204059 A1 * | 7/2014 | Geaghan ............ G06F 3/0436 |
| | | 345/173 |

(Continued)

FOREIGN PATENT DOCUMENTS

| KR | 20010040410 A | 5/2001 |
| KR | 20170085317 A | 7/2017 |
| WO | WO-2011071837 A3 * | 9/2011 ........... G06F 1/1613 |

OTHER PUBLICATIONS

U.S. Appl. No. 16/778,614.
U.S. Appl. No. 17/085,359.

*Primary Examiner* — Kwin Xie
(74) *Attorney, Agent, or Firm* — Leydig, Voit & Mayer, Ltd.

(57) ABSTRACT

A method for determining a state of a foldable device is provided. The foldable device comprises: a first set of electrodes located in a first portion of the foldable device; a second set of electrodes located in a second portion of the foldable device; a display device configured to display information to a user; and a processing system configured to: drive the first set of electrodes to generate a plurality of sensing signals that are detectable by the second set of electrodes; obtain a plurality of resulting signals associated with the plurality of sensing signals via the second set of electrodes; determine a state of the foldable device based on the plurality of resulting signals; and change one or more settings of the display device based on the determined state.

20 Claims, 15 Drawing Sheets

(56) References Cited

U.S. PATENT DOCUMENTS

| | | |
|---|---|---|
| 2016/0139725 A1 | 5/2016 | Noguchi et al. |
| 2016/0282964 A9 | 9/2016 | Kim et al. |
| 2018/0088633 A1* | 3/2018 | Whitman ............... G06F 1/1677 |
| 2019/0073036 A1* | 3/2019 | Bernstein ............... G06F 1/1662 |
| 2021/0132769 A1 | 5/2021 | Parikh et al. |
| 2022/0057889 A1 | 2/2022 | Xiao et al. |
| 2022/0075427 A1* | 3/2022 | Palmor ................. G06F 3/0418 |

\* cited by examiner

300

CLOSURE DETECTION FOR FOLDABLE DEVICES

CROSS-REFERENCE TO RELATED APPLICATIONS

This patent application is a continuation of U.S. patent application Ser. No. 17/363,138, filed Jun. 30, 2021, which is incorporated by reference herein in its entirety.

BACKGROUND

Input devices such as touch sensor devices (also commonly called touchpads or proximity sensor devices), are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Another type of input device may be a touchscreen that includes a plurality of electrodes and is also capable of allowing the user to provide user input to interact with the electronic system.

Existing foldable devices (e.g., laptops or foldable mobile phones), including foldable devices with touch sensor devices, use a dedicated sensor, such as an infrared (IR) or a Hall Sensor, for determining when a device is open or closed. When closed, the display of the foldable device changes its setting such as by entering a low-power state. For laptops, a magnetic switch or mechanical switch in the hinge is used. However, using a dedicated sensor for detecting the operating state (e.g., open or closed) of the foldable device may be unnecessary and may increase complexity. Further, a magnetic switch may also interfere with the display. For instance, the dedicated sensor may fail at a certain point during the lifetime of the foldable device, which may create problems, and even if it is operational, it still presents an additional expense when manufactured and takes up space as an additional sensor needs to be included within the device.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a foldable device comprising: a first set of electrodes located in a first portion of the foldable device; a second set of electrodes located in a second portion of the foldable device; a display device configured to display information to a user; and a processing system configured to: drive the first set of electrodes to generate a plurality of sensing signals that are detectable by the second set of electrodes; obtain a plurality of resulting signals associated with the plurality of sensing signals via the second set of electrodes; determine a state of the foldable device based on the plurality of resulting signals; and change one or more settings of the display device based on the determined state.

In another exemplary embodiment, the present disclosure provides a method comprising: driving, by a processing system of a foldable device, a first set of electrodes of the foldable device to generate a plurality of sensing signals that are detectable by a second set of electrodes of the foldable device, wherein the first set of electrodes are in a first portion of the foldable device, and the second set of electrodes are in a second portion of the foldable device; obtaining, by the processing system, a plurality of resulting signals associated with the plurality of sensing signals via the second set of electrodes; determining, by the processing system, a state of the foldable device based on the plurality of sensing signals; and changing, by the processing system, one or more settings of a display device based on the determined state.

In yet another exemplary embodiment, the present disclosure provides a non-transitory computer-readable medium having processor-executable instructions stored thereon. The processor-executable instructions, when executed, facilitate performance of the following: driving a first set of electrodes of a foldable device to generate a plurality of sensing signals that are detectable by a second set of electrodes of the foldable device, wherein the first set of electrodes are in a first portion of the foldable device, and the second set of electrodes are in a second portion of the foldable device; obtaining a plurality of resulting signals associated with the plurality of sensing signals via the second set of electrodes; determining a state of the foldable device based on the plurality of sensing signals; and changing one or more settings of a display device based on the determined state.

Further features and aspects are described in additional detail below with reference to the FIGS.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Exemplary devices and methods discussed herein provide for detecting a state (e.g., an orientation such as an open state, a closed state, and/or an angle of the opening) for foldable devices such as a laptop, foldable phone, gaming device, and/or other types of foldable devices. The foldable device may use a display device such as a touch screen and/or one or more input devices such as a touchpad to determine the state of the foldable device. For example, the foldable device may use only the capacitive touchscreen to detect the state of the device, which eliminates the need for a dedicated open/closed sensor such as an IR sensor or a hall sensor for detecting this state. Additionally, and/or alternatively, the foldable device may be a laptop and the touchscreen may interact with the touchpad to determine the state of the laptop.

By using the touchscreen and/or touchpad to detect the state of the foldable device, the foldable device might not require a dedicated open/closed sensor. As such, the devices and methods described herein provide for various advantages relative to conventional devices with the dedicated sensor—including, but not limited to reduction in bill of material (BOM) costs, assembly labor, simplification of product design, avoidance of interference to the display caused by magnetic switch, improved reliability (a statistical side effect of fewer parts), and so on.

Figure 1:
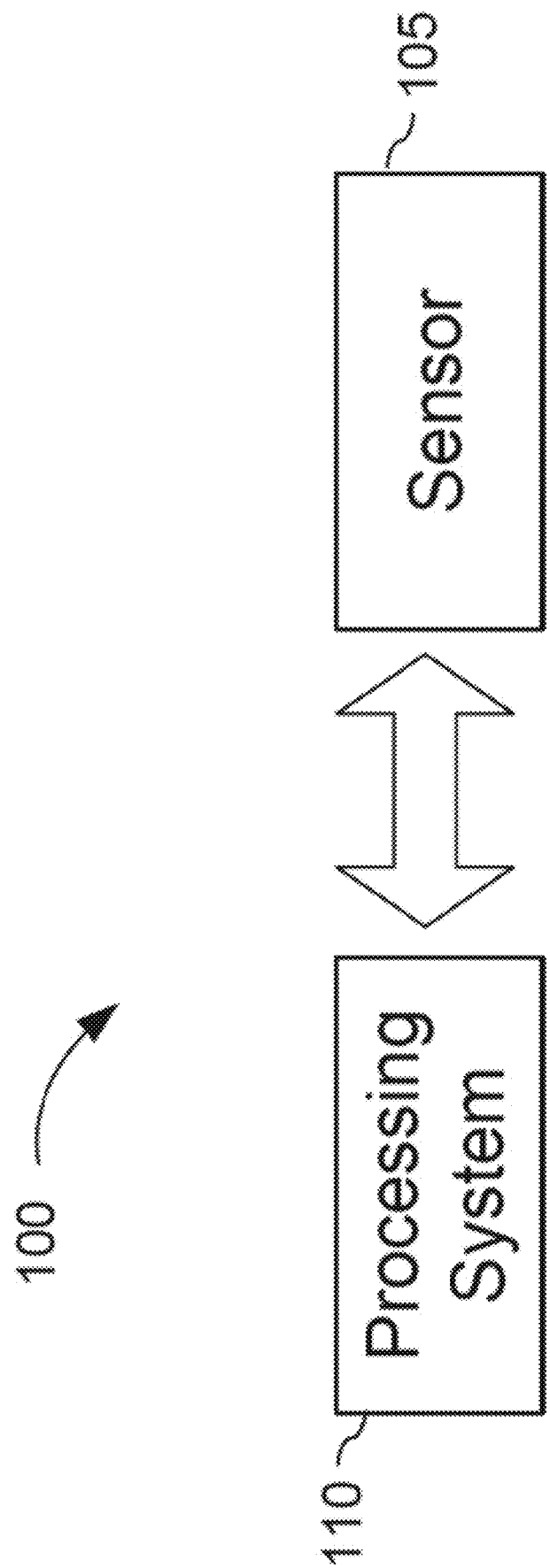
FIG. 1 is a block diagram depicting an input device according to one or more examples of the present application.

FIG. 1 is a block diagram depicting an input device according to one or more examples of the present application. The input device 100 may be configured to provide input to an electronic system. As used herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 may be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 is a capacitance (e.g., transcapacitive) input device, wherein voltage or current is applied to create an electric field. Nearby input objects cause changes in the electric field, and produce detectable changes in capacitive coupling that may be detected as changes in voltage, current, or the like.

The input device utilizes arrays or other regular or irregular patterns of capacitive sensing elements to create electric fields. In some instances, separate sensing elements may be ohmically shorted together to form larger sensor electrodes. Some other instances may utilize resistive sheets, which may be uniformly resistive.

The input device may utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground.

In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
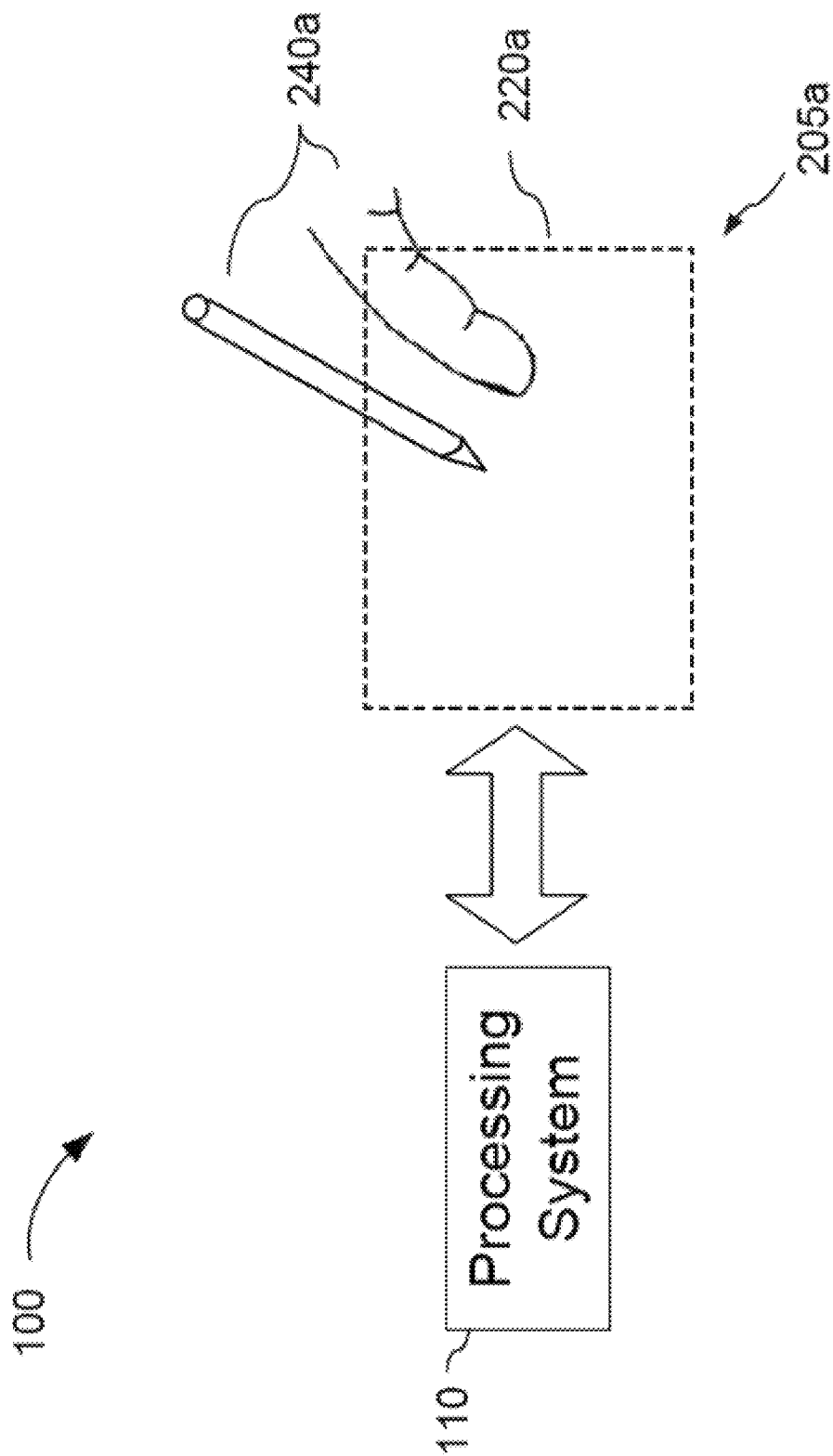
FIGS. 2A-2B are block diagrams depicting further exemplary input devices according to one or more examples of the present application.
Figure 2B:
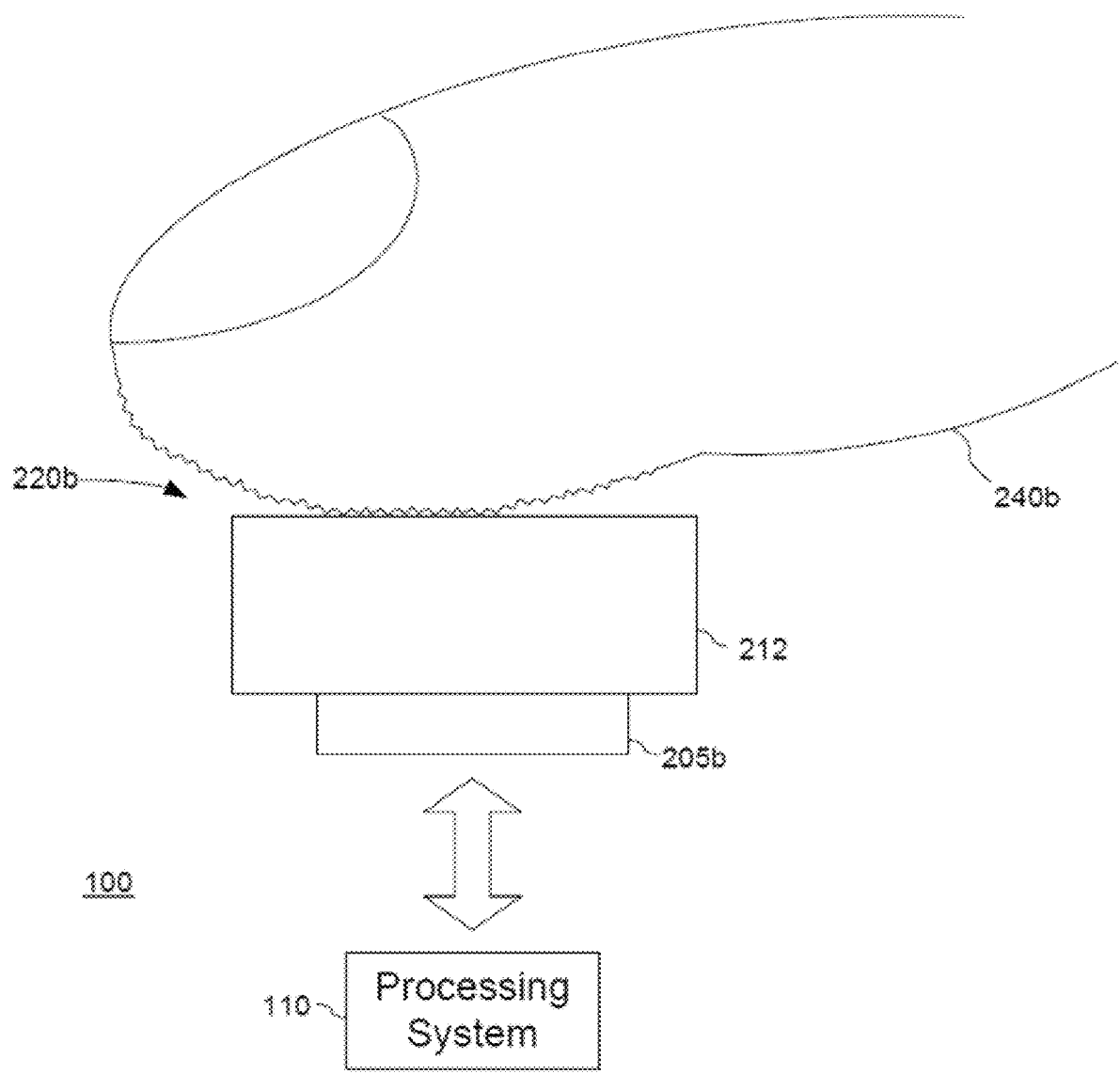

FIGS. 2A-2B are block diagrams depicting further exemplary input devices. In FIG. 2A, the input device 100 is shown as including a touch sensor 205*a*. The touch sensor 205*a* is configured to detect position information of an input object 240*a* within the sensing region 220*a*. The input object 240*a* may include a finger or a stylus, as shown in FIG. 2A. The sensing region 220*a* may include an input surface having a larger area than the input object. The touch sensor 205*a* may include an array of sensing elements with a resolution configured to detect a location of a touch to the input surface.

In FIG. 2B, the input device 100 is shown as including a fingerprint sensor 205*b*. The fingerprint sensor 205*b* is configured to capture a fingerprint from a finger 240*b*. The fingerprint sensor 205*b* is disposed underneath a cover layer 212 that provides an input surface for the fingerprint to be placed on or swiped over the fingerprint sensor 205*b*. The sensing region 220*b* may include an input surface with an area larger than, smaller than, or similar in size to a full fingerprint. The fingerprint sensor 205*b* has an array of sensing elements with a resolution configured to detect surface variations of the finger 240*b*, and the fingerprint sensor 205*b* has a higher resolution than the touch sensor 205*a* of FIG. 2A.

Figure 3:
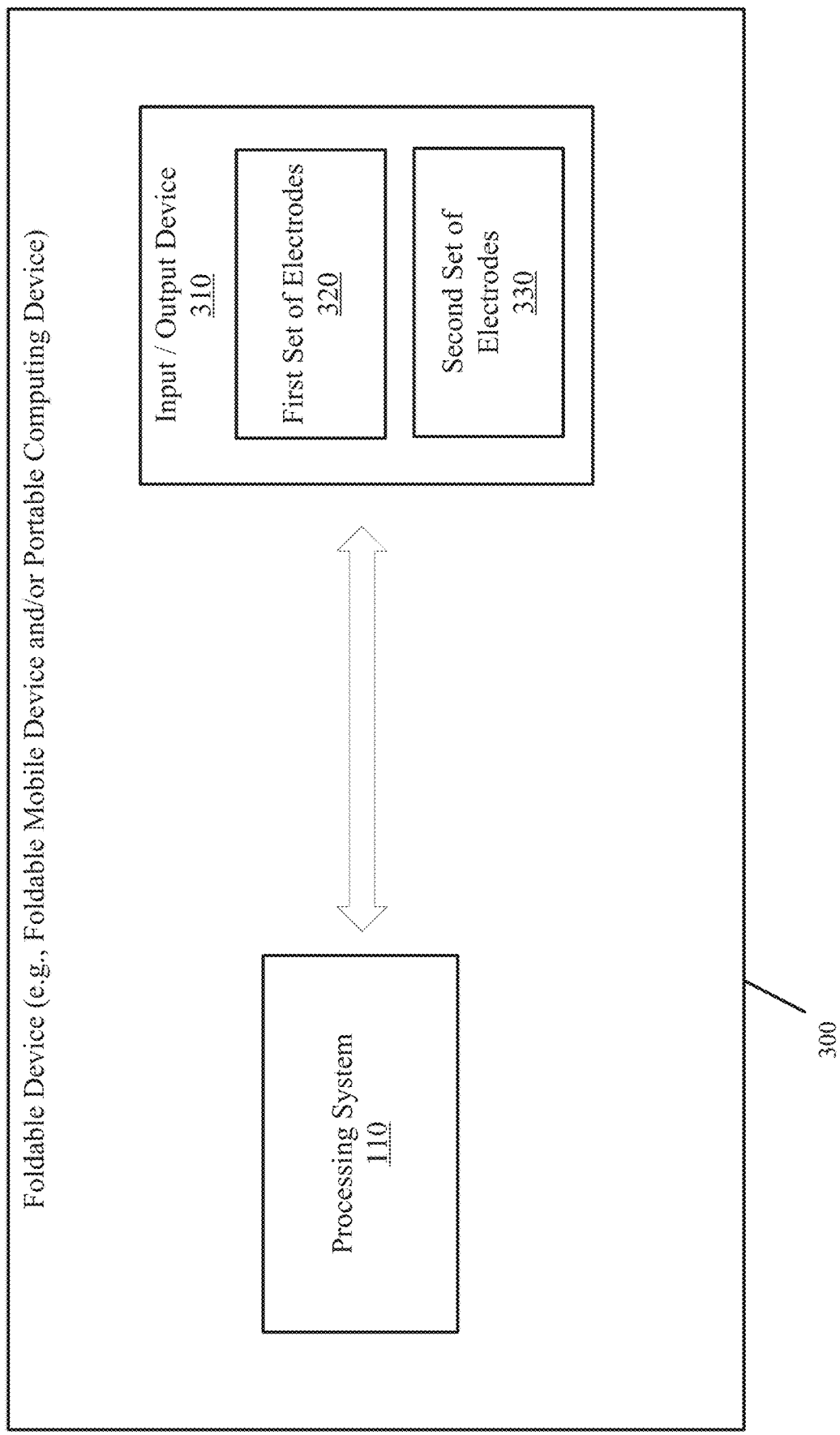
FIG. 3 is a block diagram depicting an exemplary input device that is foldable (e.g., a foldable device) according to one or more examples of the present application.
Figure 5A:
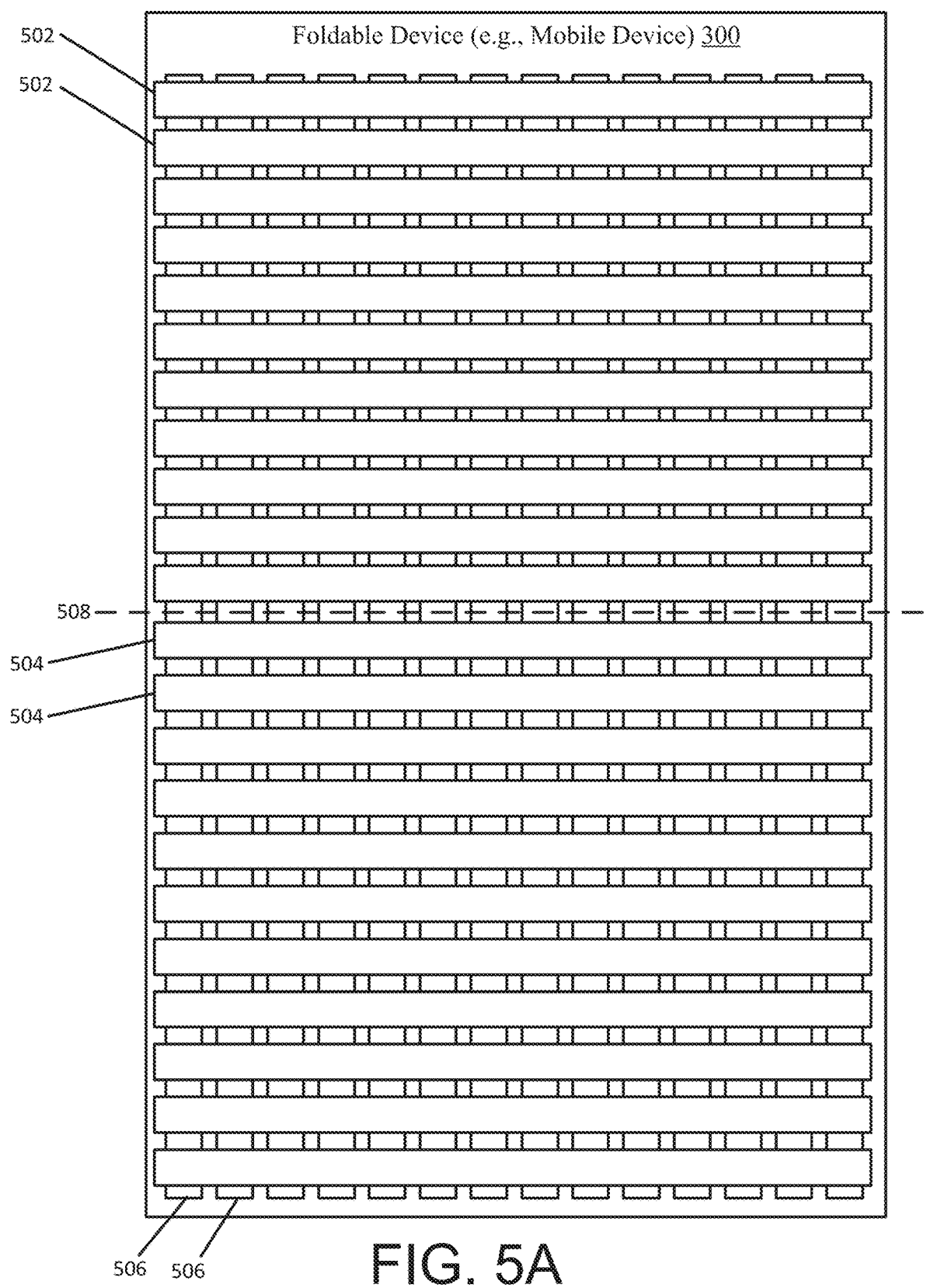
FIGS. 5A-5E depict an exemplary foldable device with transmitter electrodes and receiver electrodes for detecting the state of the foldable device according to one or more examples of the present application.

FIG. 3 is a block diagram depicting an exemplary input device that is foldable (e.g., a foldable device 300) according to one or more examples of the present application. In particular, the foldable device 300 includes the processing system 110 and an input/output device 310. The processing system 110 is described above. The input/output device 310 may be any type of device that is capable of receiving inputs (e.g., user inputs) and outputting information. For instance, the input/output device 310 may include the sensor 105 that comprises one or more sensing elements configured to sense input provided by one or more input objects (e.g., fingers, hands, styli, and so on) in a sensing region. In other words, the input/output device 310 may include electrodes such as the transmitter sensor electrodes and/or the receiver sensor electrodes of the sensor 105. For example, the first set of electrodes 320 may be operated as a set of transmitter electrodes and the second set of electrodes 330 may be operated as a set of receiver electrodes. Based on instructions from the processing system 110, the transmitter electrodes may be configured to provide a signal that is detectable by the receiver electrodes. For example, the foldable device 300 may be in an open state (e.g., lying flat). The processing system 110 may instruct the transmitter electrodes (e.g., the first set of electrodes 320) to provide one or more sensing signals. Since the foldable device 300 is in an open state (e.g., due to the distance), the receiver electrodes (e.g., the second set of electrodes 330) might not be able to detect the signal. As such, based on this, the processing system 110 may determine that the foldable device 300 is in an open state (e.g., the orientation of the device 300 is in an unfolded orientation as shown in FIG. 5A). In some instances, the device 300 may be folded onto itself. As such, the transmitter and receiver electrodes 320 and 330 may be on top of each other and thus, the receiver electrodes 330 may detect the signal transmitted by the transmitter electrodes 320. Based on the detection, the processing system 110 may determine the foldable device 300 is in a closed state (e.g., the orientation of the device 300 is in a folded position). The processing system 110 may use the state of the foldable device 300 (e.g., open or closed state) to change one or more settings. For instance, based on the foldable device 300 being in a closed state, the processing system 110 may set the foldable device 300 to be in a power saving mode.

In some instances, the state of the foldable device 300 may further indicate an angle of the foldable device 300. In other words, the processing system 110 may detect an angle of the foldable device 300. For instance, the foldable device 300 may be in a completely open or flat state (e.g., 180 degrees). It may also be in a closed state (e.g., 0 degrees). Further, the foldable device 300 may be in an intermediate state such as a portion of the device 300 (e.g., the top portion) being upright and another portion (e.g., bottom portion) being on a flat surface such as a table. In other words, the two portions of the foldable device 300 may be oriented at a 90 degree separation. The foldable device 300 may be oriented any at angle (e.g., 0 degrees may be when the device is folded onto itself, 180 degrees may be in a completely open or flat state, and any angle in-between) and the processing system 110 may use the first and second set of electrodes 320 and 330 to detect this angle. The process for detecting the angle will be described in further detail below. Based on the angle, the processing system 110 may change one or more settings for the foldable device 300. For instance, the processing system 110 may change to a power saving state based on the angle reaching a certain threshold (e.g., 10 degrees). Additionally, and/or alternatively, the processing system 110 may alter the gamma value or gamma correction value of the top portion and/or the bottom portion of the foldable device 300 based on the angle (e.g., if the angle is at 90 degrees, the top portion may have a first gamma value and the bottom portion may have a second, different gamma value).

Additionally, and/or alternatively, the input/output device 310 may include additional devices such as display devices, touchpads, and/or other types of devices. For instance, the input/output device 310 may include one or more display devices that are configured to display information. The display devices may include the first and/or second set of electrodes 320 and/or 330. For instance, the input/output device 310 may include a display device with the electrodes 320 and 330 such that the display device is a touch screen that is capable of detecting an input object such as a biometric object (e.g., a user's finger).

In some instances, the input/output device 310 may include additional input devices such as a keyboard and/or a touchpad. The processing system 110 may use feedback from the additional input devices (e.g., the touchpad) along with the electrodes 320 and/or 330 to detect a state or orientation of the foldable device 300. For instance, the display device may include the electrodes 320, which may be receiver and/or transmitter electrodes. The processing system 110 may provide instructions for these electrodes to provide a signal that is detectable by the touchpad. The touchpad may further include electrodes 330. Based on the received signal from the touchpad, the processing system 110 may determine the state and/or angle of the foldable device 300. Additionally, and/or alternatively, the touchpad may provide the signal and the electrodes (e.g., electrode 320) may detect the signal.

In some examples, the processing system 110 may include multiple processing systems. For instance, a first processing system may be in communication with and command the first set of electrodes 320 (e.g., instruct the electrodes 320 to provide the signal) and a second processing system may be in communication with and command the second set of electrodes 330 (e.g., receive input from the electrodes 330 as to the detected signal). Additionally, and/or alternatively, in examples where the foldable device 300 includes a touchpad, one or more processing systems may be associated with the electrodes and another processing system may be associated with the touchpad.

It will be appreciated that the exemplary foldable device 300 depicted in FIG. 3 is merely an example, and that the principles discussed herein may also be applicable to other foldable devices 300.

Figure 4:
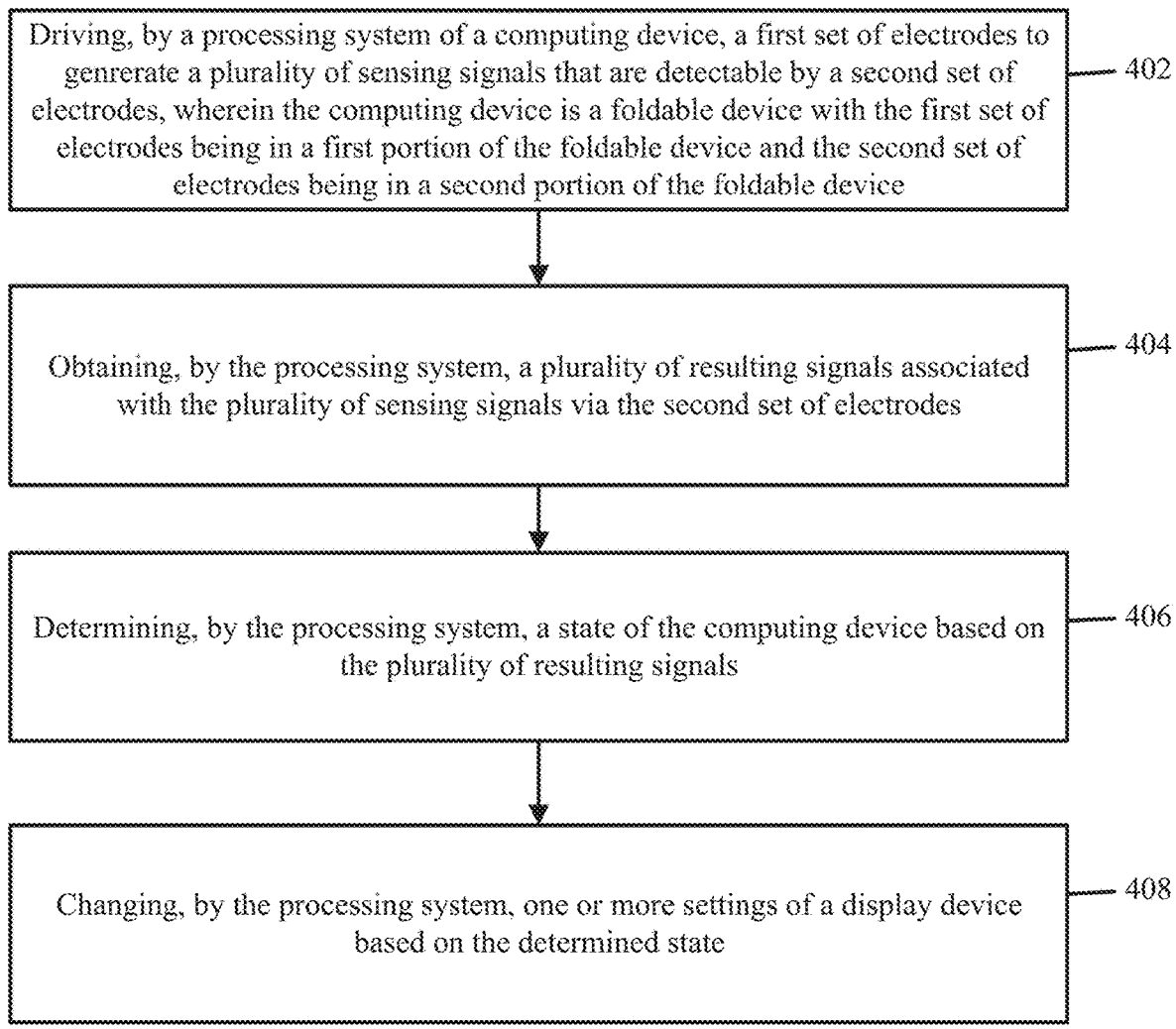
FIG. 4 is a flowchart of an exemplary process for using sets of electrodes to determine a state of the foldable device according to one or more examples of the present application.

FIG. 4 is a flowchart of an exemplary process 400 for using sets of electrodes to determine a state of the foldable device according to one or more examples of the present application. The process 400 may be performed by the foldable device 300 and in particular, the processing system 110 shown in FIG. 3. However, it will be recognized that a foldable device that includes additional and/or fewer components as shown in FIG. 3 may be used to perform process 400, that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for determining the state of the foldable device.

Figure 5B:
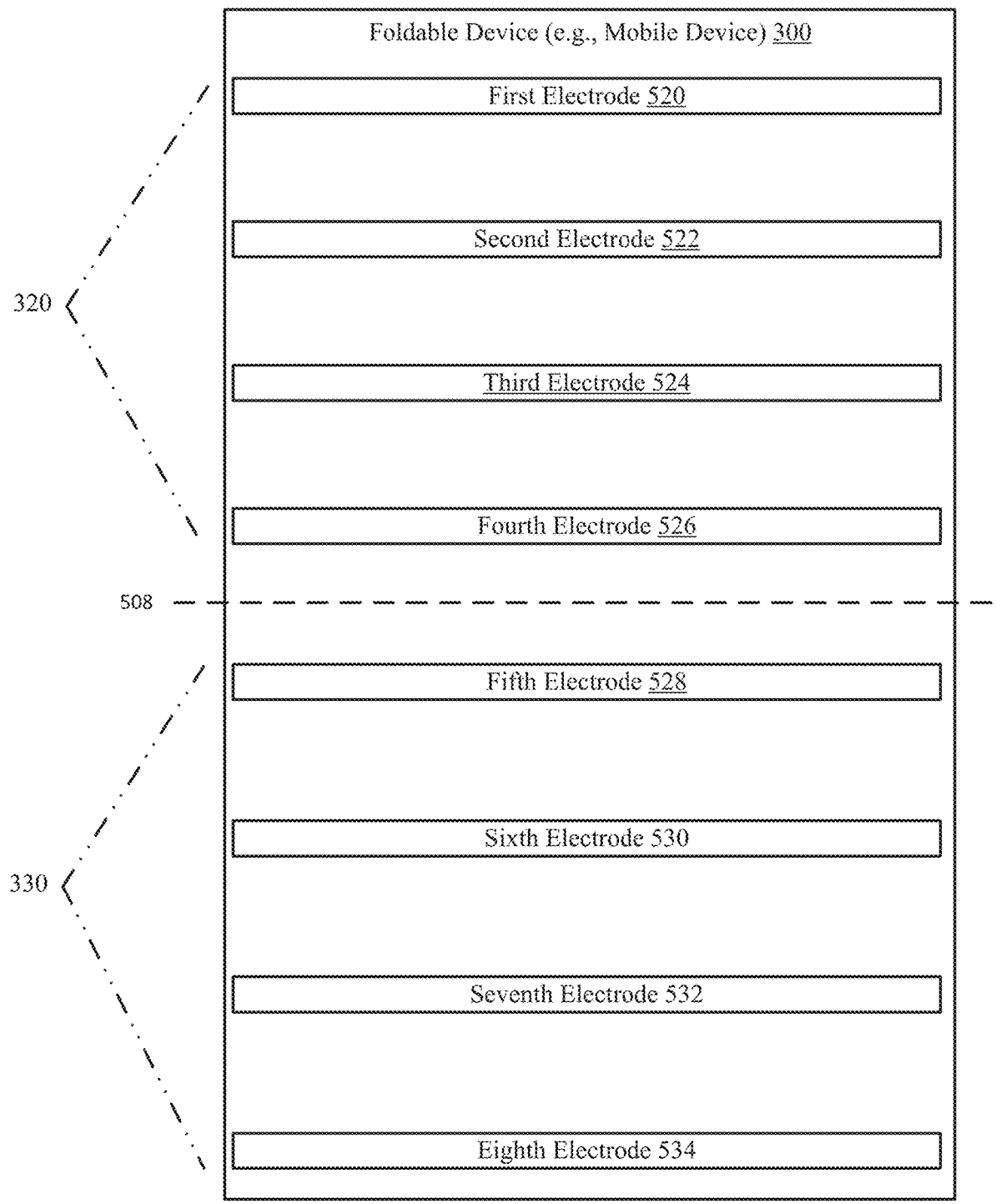

In operation, at block 402, the processing system 110 drives a first set of electrodes to generate a plurality of sensing signals that are detectable by a second set of electrodes. The computing device is a foldable device with the first set of electrodes being in a first portion of the foldable device and the second set of electrodes being in a second portion of the foldable device. For instance, the first set of electrodes 320 may be transmitter electrodes and the second set of electrodes 330 may be the receiver electrodes. The processing system 110 may drive (e.g., direct and/or provide one or more instructions, commands, and/or information to) the first set of electrodes 320 with a plurality of sensing signals that the second set of electrodes 330 may be able to detect based on the state (e.g., orientation and/or angle) of the foldable device 300. FIGS. 5A and 5B will describe this in more detail.

Figure 5C:
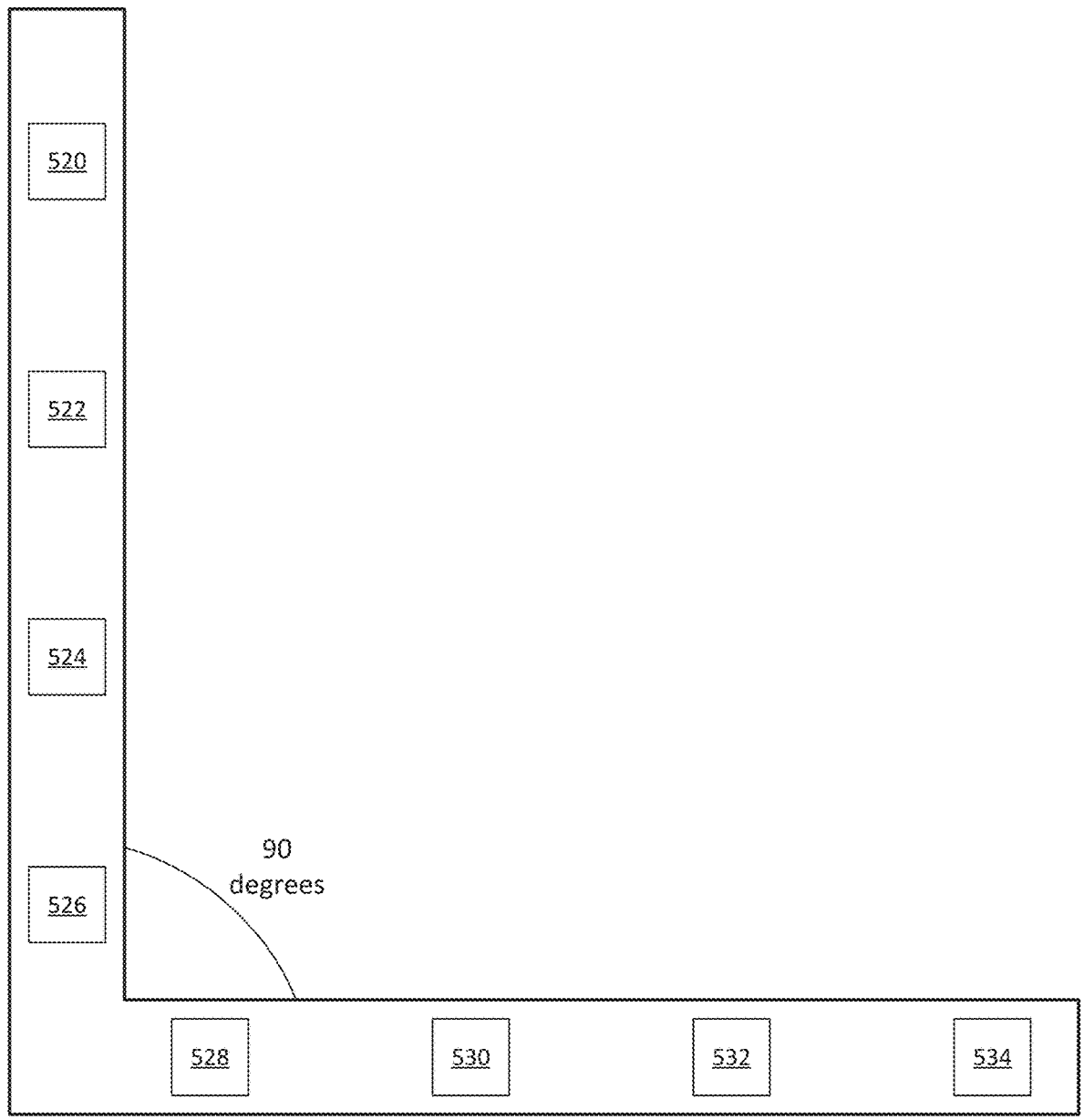
Figure 5D:
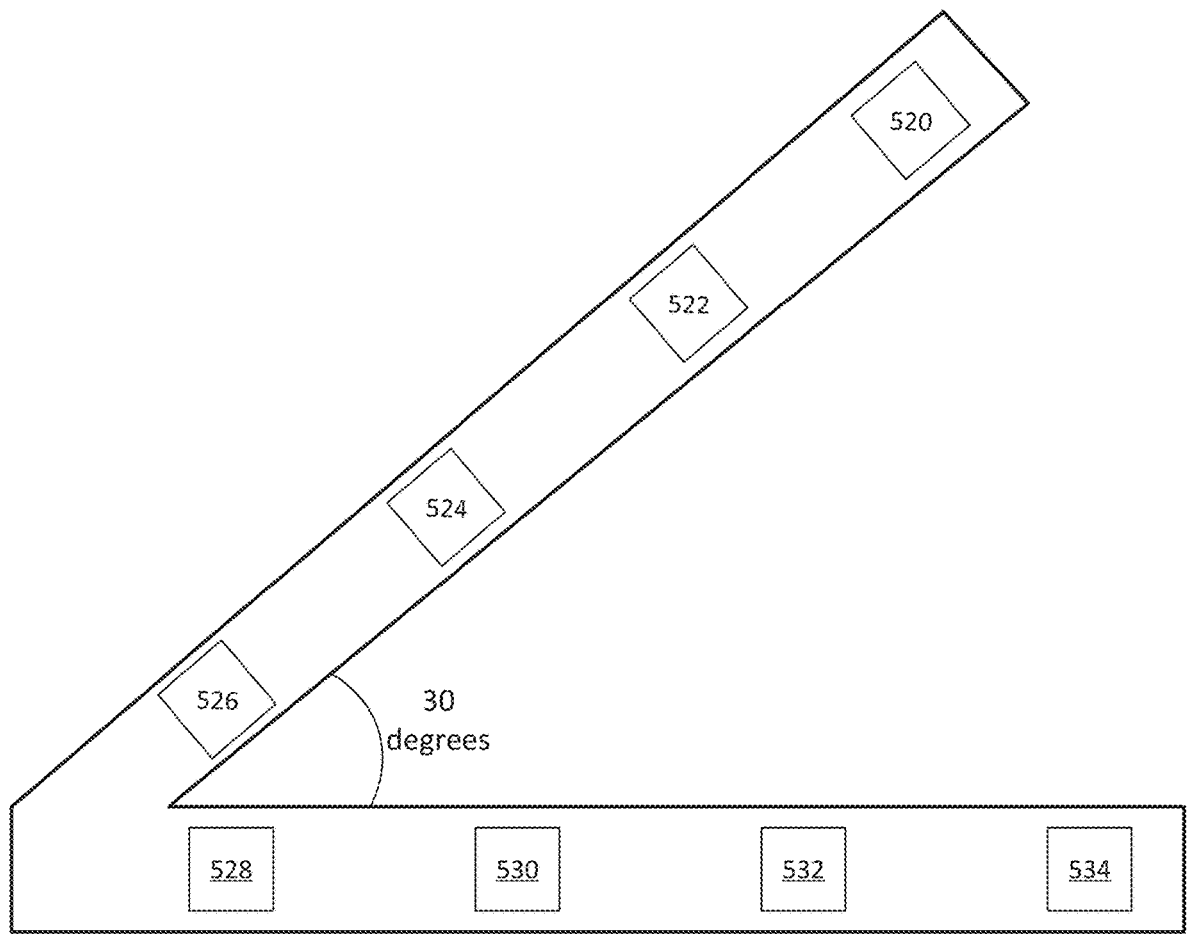
Figure 5E:
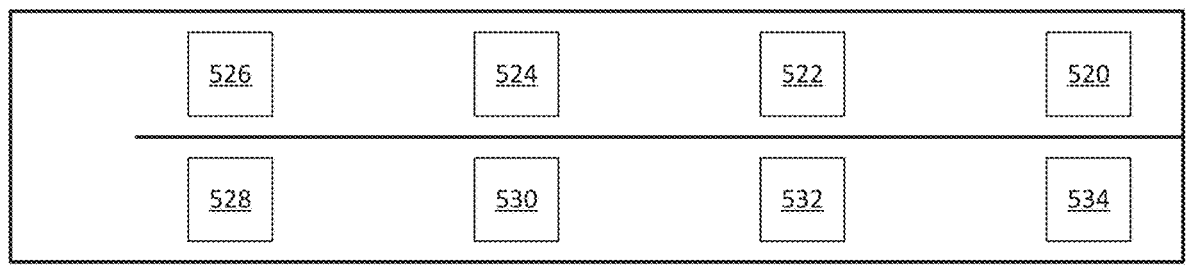

In particular, FIGS. 5A-5E depict an exemplary foldable device with transmitter electrodes and receiver electrodes for detecting the state of the foldable device according to one or more examples of the present application. Referring to FIG. 5A, a foldable device 300 (e.g., a mobile phone) that includes an exemplary orthogonal grid of electrodes 502, 504, and 506 is shown. For instance, the foldable device 300 includes vertical electrodes 506 and two sets of horizontal electrodes 502 and 504 that are separated by a dotted line 508 denoting a foldable portion 508. In operation, the foldable device 300 may fold over itself at the foldable portion 508. For example, the foldable device 300 may have a hinge and/or other technique or mechanism that allows the device 300 to fold onto itself. For instance, as shown, the foldable device 300 is in an open state (e.g., completely flat). Then, a user may fold the foldable device 300 along the foldable portion 508 until the top portion (e.g., the portion above the foldable portion 508) is directly on-top of the bottom portion (e.g., the portion below the foldable portion 508), which is shown in FIG. 5E and described below. Each of these portions may have their own horizontal electrodes. For instance, the top portion's electrodes are denoted by 502 and the bottom portion's electrodes are denoted by 504. A set of the electrodes 502, 504, and/or 506 may be transmitter electrodes and/or receiver electrodes. For instance, several of the horizontal electrodes 502 in the top portion of the foldable device 300 may be transmitter electrodes and several of the horizontal electrodes 504 in the bottom portion of the foldable device 300 may be receiver electrodes. This will be described in more detail in FIG. 5B.

It will be appreciated that the electrodes shown in FIG. 5A are shown for illustrative purposes, but that exemplary implementations of the electrodes of the foldable device 300 may be of any size—including, for example, 16×16 (e.g., 16 rows of electrodes and 16 columns of electrodes), 56×96, 80×80, 88×116, 56×144, 72×80, etc. It will further be appreciated that although a grid with transmitter electrodes and receiver electrodes orthogonal to one another in a bars and stripes configuration is used herein as an example, other exemplary implementations of a foldable device may utilize other configurations of transmitter electrodes and receiver electrodes—including, for example, single-layer configurations with interdigitated electrodes, matrix configurations where each pixel corresponds to an electrode plate, orthogonal diamond configurations, etc.

FIG. 5B depicts the foldable device 300 with transmitter electrodes and receiver electrodes for detecting the state of the foldable device according to one or more examples of the present application. In particular, a first and second set of electrodes from the plurality of electrodes shown in FIG. 5A may be used to detect the state of the foldable device 300. For example, the first set of electrodes 320 may include four electrodes 520-526 that are transmitter electrodes and the second set of electrodes 330 may include four electrodes 528-534 that are receiver electrodes. The four electrodes 520-526 may be from the row electrodes 502 shown in FIG. 5A and the four electrodes 528-534 may be from the row electrodes 504. Each of these electrodes may have a counterpart electrodes such that they make up four pairs of electrodes with each pair having a receiver and a transmitter electrode. For instance, the first electrode 520 may be paired with the eighth electrode 534, the second electrode 522 may be paired with the seventh electrode 532, and so on. In operation, the processing system 110 may drive the transmitter electrodes such that they are detectable by their paired receiver electrode (e.g., the first electrode 520 may generate one or more signals that are detectable by the eighth electrode 534). In alternative embodiments, the transmitter electrodes may be set up in a manner that is not necessarily "paired" to receiver electrodes (for example, the foldable device may be configured to drive a large number of transmitter electrodes such that each respective receiver electrode may be responding to drive signals on multiple transmitter electrodes).

In operation, in a flat state, the transmitter electrodes 320 may be driven to produce the sensing signals, but the receiver electrodes 330 might not be able to detect any of these signals. However, as the folded device is folded on top of itself, the receiver electrodes 330 may be able to detect the signals produced by the transmitter electrodes 320. Additionally, and/or alternatively, the difference between the detected signals on respective receiver electrodes may be used to determine an angle of the foldable device 300. FIGS.

5C-5E will describe the foldable device 300 in different angles and positions (e.g., FIG. 5C shows the device 300 at a 90 degree angle, FIG. 5D shows the device 300 at a 30 degree angle, and FIG. 5E shows the device at a 0 degree angle). For example, referring to FIG. 5C and when the device 300 is at a 90 degree angle, the fifth electrode 528 may be able to detect a strong signal (e.g., a signal that has a magnitude above a certain threshold) emanating from the fourth electrode 526. The sixth electrode 530 may further be able to detect a signal emanating from the third electrode 524. This signal may be less in magnitude than the signal from the fifth electrode, but still significant and over a certain threshold. However, the seventh and eighth electrodes 532 and 534 might not be able to detect anything from the first and second electrodes 520 and 522. Referring to FIG. 5D, in a 30 degree position, the fifth and sixth electrodes 528 and 530 may be able to detect an even greater signal as the top portion of the device 300 is coming closer to the bottom portion of the device 300. Similarly, the seventh electrode 532 may also be able to detect signals from the second electrode 522. Referring to FIG. 5E, in a closed position (e.g., 0 degrees), all four receiver electrodes 528-534 may be able to detect their resulting signals from their counterpart transmitter electrodes 520-526 as they are substantially on top of each other. Accordingly, by using the transmitter and receiver electrodes, the processing system 110 is able to determine the state, including the angle, of the foldable device 300.

It will be appreciated that the exemplary foldable device 300 depicted in FIGS. 5A and 5B is merely an example, and that the principles discussed herein may also be applicable to other foldable devices 300 with additional and/or alternative arrangements of electrodes. For instance, the receiver and transmitter electrodes may be located different from the arrangement shown in FIG. 5B and/or different sets of electrodes may be selected from FIG. 5A to be used for determining the state of the foldable device 300. Additionally, and/or alternatively, four pairs of electrodes are shown in FIG. 5B, but in some examples, a different number of pairs of electrodes may be used to determine the state of the foldable device 300. As shown, the first set of electrodes 320 that are transmitter electrodes are shown to be on the top portion of the device 300 and the second set of electrodes 330 that are the receiver electrodes are shown to be on the bottom portion of the device 300. In some instances, this may be reversed (e.g., the top portion may be the receiver electrodes and the bottom portion may be the transmitter electrodes).

Referring back to block 402, the processing system 110 may drive a first set of electrodes (e.g., the set of electrodes 320 such as the electrodes 520-526 shown in FIG. 5B) to generate a plurality of sensing signals that are detectable by the second set of electrodes 330 (e.g., electrodes 528-534). The first set of electrodes 320 operated as transmitter electrodes are on a first (e.g., top) portion of the foldable device 300 above the foldable portion 508, and the second set of electrodes 330 operated as receiver electrodes are on a second (e.g., bottom) portion of the foldable device 300.

At block 404, the processing system 110 obtains a plurality of resulting signals associated with the plurality of sensing signals via the second set of electrodes. In other words, based on driving the first set of electrodes 320 to generate the plurality of sensing signals, resulting signals are detected on the second set of electrodes 330 (e.g., electrodes 528-534). For instance, as mentioned above, depending on the state/angle of the foldable device 300, different variations of resulting signals may be detected on the second set of electrodes 330. In a closed/0 degree state (e.g., as shown in FIG. 5E), each of the second set of electrodes 330 may detect substantially similar and strong resulting signals. In a partially open state (e.g., 30 degrees as shown in FIG. 5D), the strength of the resulting signals may be proportional to the distance of the respective receiver electrodes to the hinge 508 (e.g., with the device at a 30 degree opening, a relatively strong signal may be detected on fifth electrode 528, a weaker resulting signal may be detected on sixth electrode 530, an even weaker resulting signal may be detected on seventh electrode 532, and no signal or an even weaker resulting signal may be detected on the eighth electrode 534). In an upright position (e.g., 90 degrees as shown in FIG. 5C), there may be no resulting signals detected on the sixth, seventh and eighth electrodes 530, 532, 534, and a very weak or no resulting signal detected on the fifth electrode 528.

At block 406, the processing system 110 determines a state of the computing device based on the plurality of resulting signals. For instance, in a simplified example, the processing system 110 may use the resulting signals to determine whether the foldable device 300 is in an open state or a closed state. For example, the processing system 110 may compare the resulting signals with one or more thresholds (e.g., a single threshold for all four receiver electrodes shown in FIG. 5B or an individual threshold for each of the receiver electrodes from FIG. 5B). Based on the comparison, the processing system 110 may determine whether the foldable device 300 is in an open state or a closed state. In other words, the processing system 110 may determine a relative state or position of a first portion of the foldable device (e.g., the portion above the foldable portion 508) as compared to (e.g., relative to) a second portion of the foldable device (e.g., the portion below the foldable portion 508).

Additionally, and/or alternatively, the processing system 110 may use one or more ratios between resulting signals received on respective receiver electrodes to determine whether the foldable device 300 is in an open or closed state and/or to determine an angle of opening. For instance, the processing system 110 may determine one or more ratios between resulting signals received via the fifth, sixth, seventh and eighth electrodes 528, 530 532, 534. The processing system 110 may use these ratios (e.g., by comparing it with one or more thresholds) to determine the state of the foldable device 300. The ratios include, for example, a first ratio between the fifth and sixth electrodes 528/530, a second ratio between the fifth and seventh electrodes 528/532, a third ratio between the fifth and eighth electrodes 528/534, a fourth ratio between the sixth and seventh electrodes 530/532, a fifth ratio between the sixth and eighth electrodes 530/534, and/or a sixth ratio between the seventh and eighth electrodes 532/534. An advantage of utilizing these ratios is that the detection process is less susceptible to noise which affects the receiver electrodes, thereby providing differential measurements which removes such common noise. It will be appreciated that in a closed (0 degree state), the ratios (assuming substantially uniform drive signals on the transmitter electrodes) would be close to 1, and as the device becomes more and more open, the ratios will proportionally get farther and farther from 1. For example, if the processing system is taking into consideration a ratio of resulting signals obtained via the fifth electrode 528 to resulting signals obtained via the sixth electrode 530, the ratio will get larger and larger as the angle of opening starts from 0 and increases. On the other hand, if the processing system is taking into consideration a ratio of resulting signals obtained via the sixth electrode 530 to resulting signals obtained via the fifth electrode 528, the ratio will get smaller and smaller as the angle of opening starts from 0 and increases.

In some instances, the processing system 110 may use a look-up table (LUT) that stores one or more ratio to determine the state/angle of the foldable device 300. Based on the values from the LUT, the processing system 110 may determine the angle of the foldable device 300. For example, the processing system 110 may initially calibrate the foldable device 300 by driving the transmitter electrodes and obtaining the resultant signals at the receiver electrodes. The processing system 110 may then determine one or more ratios based on the resultant signals and obtain (e.g., via user input) a state/angle of the foldable device 300. The processing system 110 may then store these ratios as well as the state/angle into the LUT. The processing system 110 may continue this process for one or more other states/angles of the foldable device 300 and store these values into the LUT as well. Afterwards, the processing system 110 may store the LUT in memory and then use the LUT to determine the state/angle of the foldable device 300 in operation. In some examples, by using a LUT with the ratios, the calibration may be sufficient to determine the state/angle of the foldable device 300 over a long period of time (due to the use of differential readings, wear and tear on the device which would affect the readings on all receiver electrodes would not degrade the accuracy of the calibration). In some variations, the stored LUT may include a plurality of entries. For example, each of the entries may indicate an angle of the foldable device 300 and one or more ratios associated with the angle.

At block 408, the processing system 110 changes one or more settings of a display device based on the determined state. For instance, in a simplified example with an open and closed state, the processing system 110 may determine whether the foldable device 300 is in an open state or a closed state based on the resulting signals. Then, the processing system 110 may change one or more settings for the display device based on the state. For example, the processing system 110 may use a power saver mode for the display device and/or for the entire foldable device 300 based on the determination that the foldable device is in a closed state. The power saver mode may attempt to preserve power such as by turning off the display device.

In some instances, the settings may be based on an angle or orientation of the foldable device 300. For instance, the processing system 110 may engage the power saver mode based on the foldable device 300 reaching a certain angle (e.g., 10 degrees). Additionally, and/or alternatively, the processing system 110 may apply display setting such as applying gamma compensation to the foldable device 300. For instance, the processing system 110 may apply a gamma value to the top portion of the display of the foldable device that is different from a display setting for the bottom portion of the display based on the angle of the foldable device 300. Gamma compensation or correction may control an overall brightness of the display. For example, gamma correction may be a nonlinear operation used to encode and/or decode luminance, brightness, and/or tristimulus values for a display. Gamma correction may use a value (e.g., a gamma value) for this compensation. The processing system 110 may determine, based on the angle of the foldable device, these values (e.g., a first and second gamma values) for the top portion and bottom portion of the foldable device and use these values for gamma compensation.

Additionally, and/or alternatively, the display settings may further include, but are not limited to, changing the color gamut and/or the brightness (e.g., luminance) levels. For instance, the processing system 110 may change the color gamut and/or brightness level based on the angle of the foldable device 300.

In some examples, the processing system 110 may use a driving scheme that instructs all of the transmitter electrodes to generate the sensing signals at the same time (e.g., firing the transmitter electrodes at the same time) to determine the state/angle of the foldable device 300. In other examples and referring to FIG. 5B, the processing system 110 may use a driving scheme that causes each of the transmitter electrodes to generate the sensing signals in a sequential order. For example, the processing system 110 may cause a first transmitter electrode (e.g., the first electrode 520) to generate a sensing signal and each of the receiver electrodes (e.g., electrodes 528-534) may attempt to detect the resulting signal. Then, the processing system 110 may cause a second transmitter electrode (e.g., the second electrode 522) to generate a sensing signal, and so on. The processing system 110 may use the resultant signals associated with each of the transmitter electrodes to determine the state and/or angle of the foldable device 300. For example, the processing system 110 may determine ratios from the resultant signals and determine the state/angle of the foldable device 300 based on the state/angle.

In some variations, the processing system 110 may dim the display of the foldable device 300 (e.g., reduce the brightness of the display) as the angle of the foldable device decreases. For instance, based on the foldable device 300 being above a threshold such as above a 30 degree angle (e.g., above the orientation shown on FIG. 5D), the display screen of the foldable device may be at full brightness. Then, the foldable device 300 may dim the display as the angle of the foldable device 300 decreases. For instance, in some examples, for every 10 degrees (e.g., 20 degrees and 10 degrees), the foldable device 300 may dim the display by a certain amount until the foldable device 300 is closed (e.g., at 0 degrees). Once closed, the foldable device 300 may turn off the display. In other examples, the foldable device 300 may dim the display based on the angle of the display. For instance, the foldable device 300 may dim the display for every degree under 30 degrees (e.g., the brightness dims by $\frac{1}{30}$ for each degree below 30 degrees). This may confirm to the user that the foldable device is turned off. Additionally, and/or alternatively, this functionality may also serve as a "night light." By dimming the foldable device 300 based on the angle, the foldable device 300 may auto-dim and the user might not need to manually dim the display.

Figure 6:
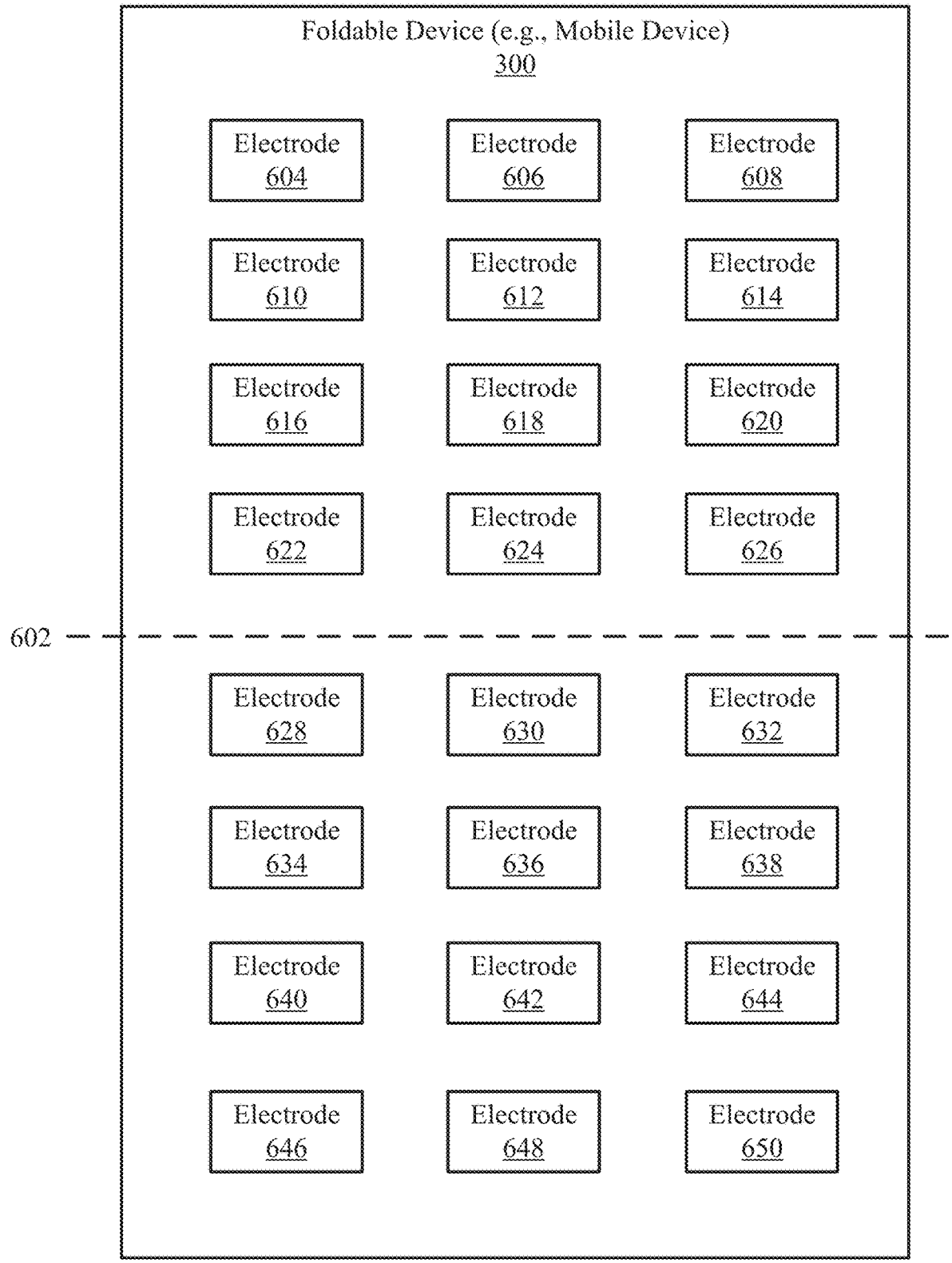
FIG. 6 depicts another exemplary foldable device with electrodes for detecting the state of the foldable device according to one or more examples of the present application.

The electrode configuration (e.g., the bars and stripes electrode configuration) shown in FIGS. 5A and 5B is merely an example and process 400 may use any type of electrode configuration to determine the state/angle of the foldable device 300. For example, FIG. 6 depicts another exemplary foldable device with electrodes for detecting the state of the foldable device according to one or more examples of the present application. Referring to FIG. 6, the foldable device 300 includes a dotted line 602 denoting a foldable portion for the foldable device 300. Above the foldable portion 602 are individual electrodes 604-626 and below the foldable portion 602 are electrodes 628-650. Each of the electrodes 604-650 may be capable of being transmitter electrodes as well as receiver electrodes. For instance, the first set of electrodes 320 (e.g., the transmitter electrodes) may be the set of electrodes 604-626 that are above the foldable portion 602 and the second set of electrodes 330

(e.g., the receiver electrodes) may be the set of electrodes 628-650 that are below the foldable portion 602. Alternatively, the first set of electrodes 320 may be the set of electrodes 628-650 and the second set of electrodes 330 may be the electrodes 604-626. Process 400 may use the electrode pairs of transmitter/receiver electrodes (e.g., electrode 604 may be the transmitter and electrode 646 may be the receiver) to determine the state/angle of the foldable device 300.

In yet other examples, process 400 may use other types of electrode configurations. It will be appreciated that the principles discussed herein may be applied to many different variations of foldable devices having electrodes on both sides of a folding element (e.g., a hinge), wherein the electrodes on one side may be operated as transmitter electrodes and the electrodes on the other side may be operated as receiver electrodes. In some instances, the electrodes of the foldable device 300 may be driven at the same time and/or driven using code division multiplexing (CDM). By using CDM, noise may be reduced. In other instances, the electrodes of the foldable device 300 may be driven using other driving schemes such as sequential, inverted, and so on.

Figure 7:
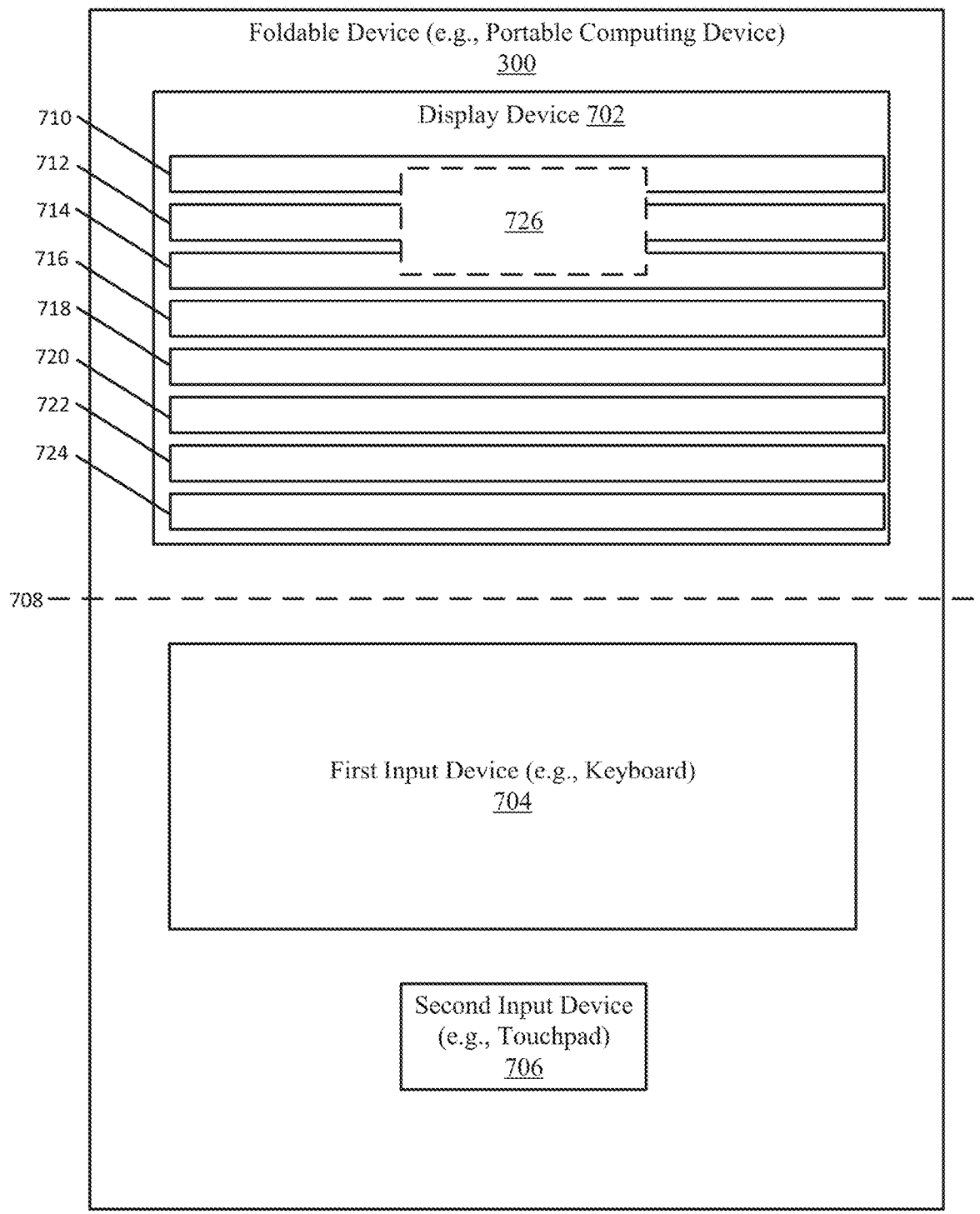
FIG. 7 depicts another exemplary foldable device with electrodes and an input device for detecting the state of the foldable device according to one or more examples of the present application.

The foldable device 300 may be any type of device that is foldable. For example, FIGS. 5A, 5B, and 6 show the foldable device 300 as a mobile device with a single touchscreen/display device. FIG. 7 depicts another exemplary foldable device with electrodes and an input device for detecting the state of the foldable device according to one or more examples of the present application. In particular, FIG. 7 shows a portable computing device such as a laptop computer. The portable computing device includes a display device 702, a first input device (e.g., keyboard) 704, and a second input device (e.g., touchpad) 706.

The portable computing device may further include the processing system 110 (not shown) and the processing system 110 may use the electrodes of the display device 702 and/or the touchpad 706 to determine the state/orientation of the portable computing device. For example, the display device 702 may include a plurality of bar electrodes 710-724 that may be receiver and/or transmitter electrodes. Further, the second input device (e.g., touchpad 706) may further include electrodes that may be receiver and/or transmitter electrodes. The processing system 110 may use the electrodes from the display device 702 that overlap the touchpad 706 to determine the state/angle of the foldable device 300. For example, in a closed state, a portion of the electrodes from the display device 702 may overlap or be on top of the touchpad 706. This is denoted by the rectangular portion 726, which includes electrodes 710-714. The other electrodes 716-724 might not overlap or be on top of the touchpad 706.

As such, the processing system 110 may use process 400 and the electrodes 710-714 that overlap with the second input device 706 in the closed position to determine the angle/state of the portable computing device. For example, the electrodes 710-714 may be transmitter electrodes that are configured to generate a plurality of sensing signals. The electrodes within the touchpad 706 may be receiver electrodes that are capable of detecting the plurality of sensing signals. Based on the obtained resulting signals associated with the plurality of sensing signals, the processing system 110 may determine a state of the foldable computing device 300 and then change one or more settings of the display device 702 (e.g., set the display device 702 into a power saving mode). In some examples, the electrodes 710-714 may be the receiver electrodes and the electrodes within the touchpad 706 may be the transmitter electrodes.

In some variations, the foldable device 300 may include two or more processing systems. For example, the display device 702, along with the electrodes 710-714, may be in communication with and/or controlled by a first processing system and the touchpad 706 may be in communication with and/or controlled by a second processing system. The first and second processing systems may work together to determine the state/angle of the foldable device 300.

In some instances, the display device 702 may include a different electrode configuration. The processing system 110 may use the different electrode configuration of the display device 702 to determine the state/angle of the foldable device 300.

Figure 8:
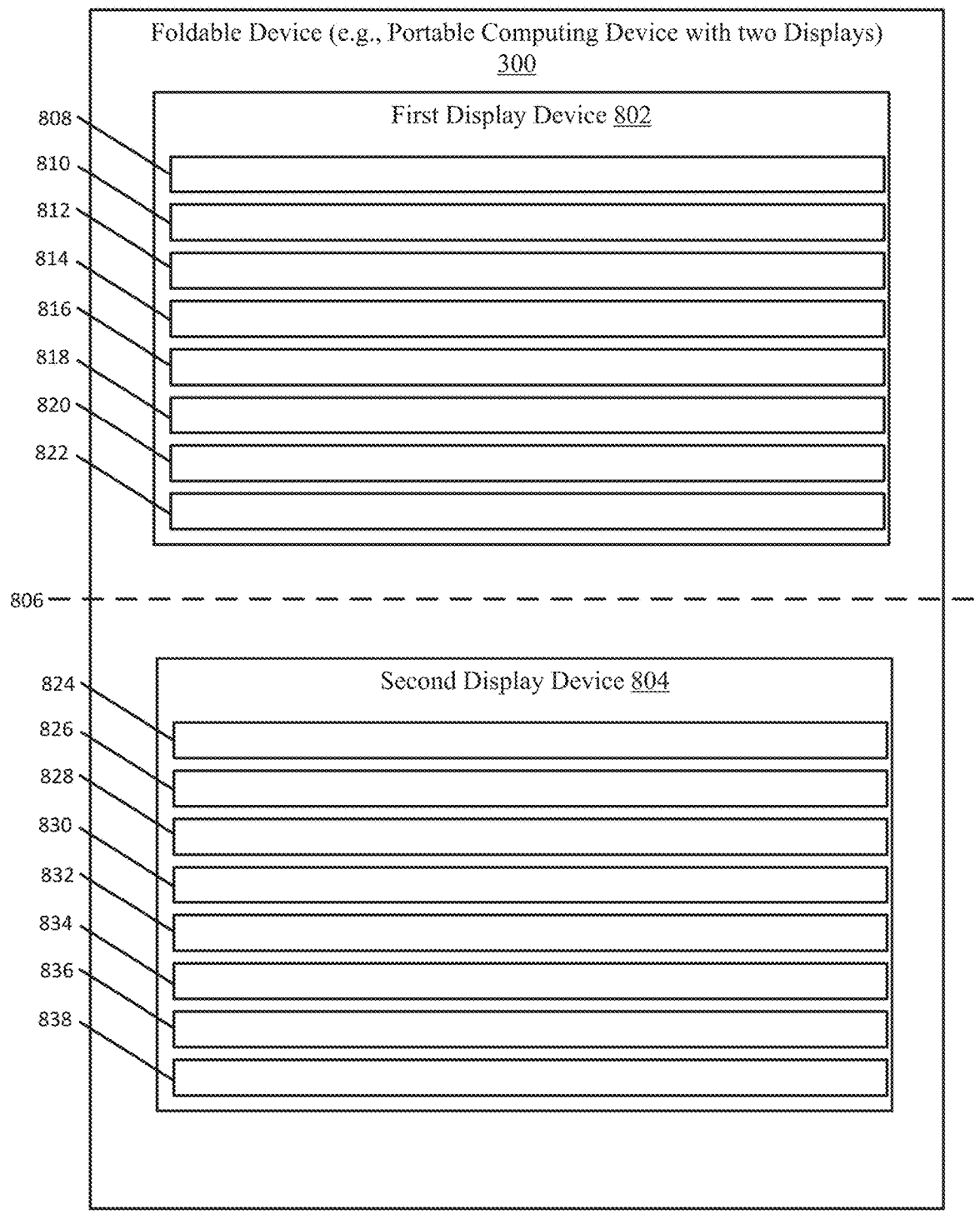
FIG. 8 depicts another exemplary foldable device with two display devices for detecting the state of the foldable device according to one or more examples of the present application.

FIG. 8 depicts another exemplary foldable device with electrodes and an input device for detecting the state of the foldable device according to one or more examples of the present application. In particular, FIG. 8 shows a portable computing device such as a gaming system. The portable computing device includes two display devices 802 and 804 with a foldable portion 806. The first display device 802 may include electrodes 808-822 and the second display device 804 may include electrodes 824-838. The portable device may use the electrodes 808-838 along with process 400 to determine the state/angle of the portable device. In some examples, the display devices 802 and 804 may include different electrode configurations. The processing system 110 may use the different electrode configurations of the display devices 802 and 804 to determine the state/angle of the foldable device 300.

Figure 9:
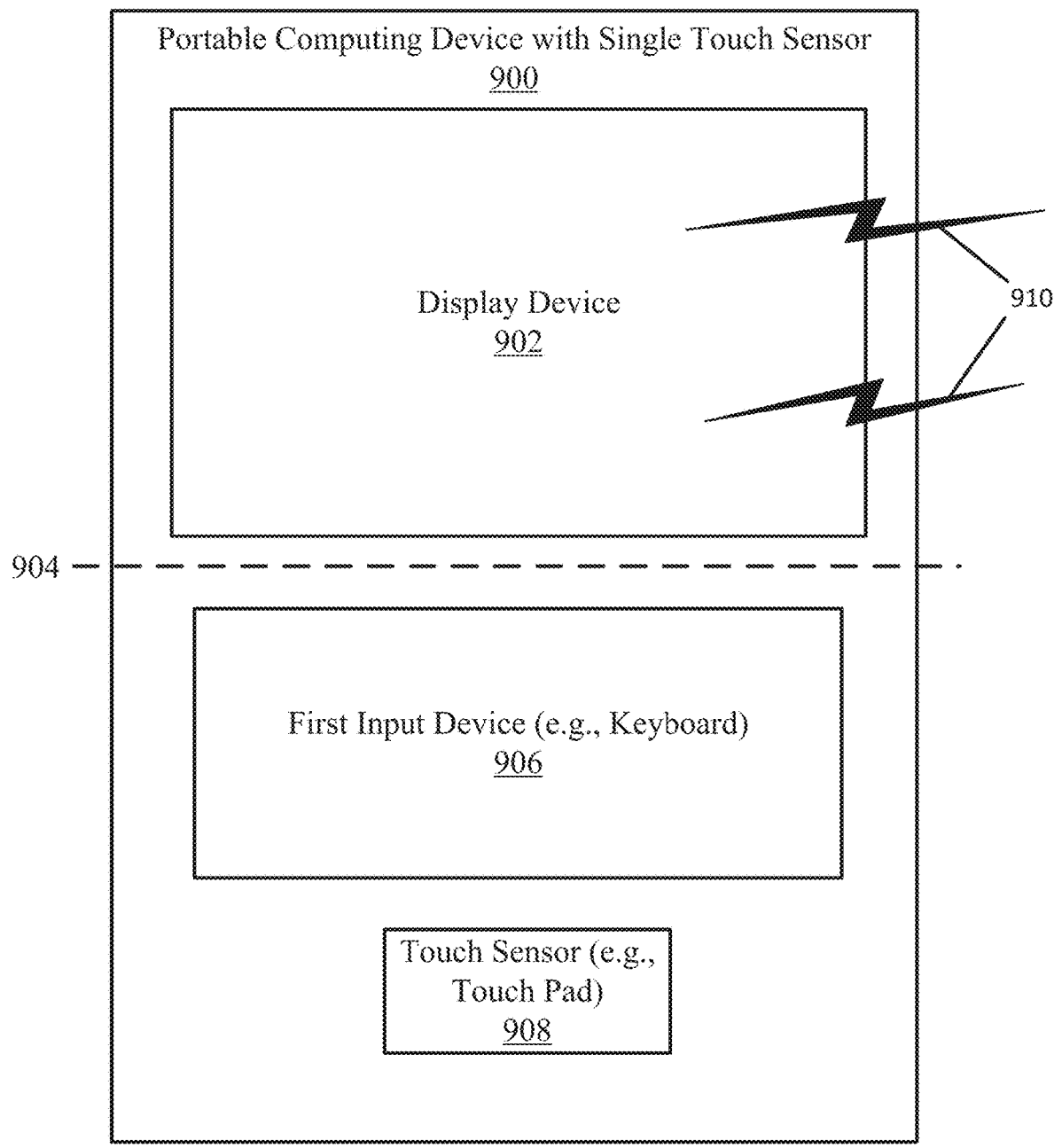
FIG. 9 is a block diagram depicting an example portable computing device with a touch sensor according to one or more examples of the present application.

FIG. 9 is a block diagram depicting an example portable computing device with a touch sensor according to one or more examples of the present application. In particular, the portable computing device 900 includes a display device 902, a foldable portion 904, a first input device 906 (e.g., keyboard), and a touch sensor 908 (e.g., touch pad). For example, the portable computing device 900 may be a laptop without the display device 902 being a touch screen (e.g., the display device 902 might not respond to user/object input). The portable computing device 900 may include the processing system 110 (not shown) and the processing system 110 may use the noise 910 generated by the display device 902 to determine the state of the portable computing device 900. For example, in operation (e.g., when the display device 902 is on and displaying information), the display device 902 may generate noise 910. In an upright/open state, the noise 910 might not be detectable by the touch sensor 908. However, in a closed state (e.g., when the display device 902 is substantially on top of or nearing the touch sensor 908), the touch sensor 908 is able to detect the noise 910 generated by the display device 902 through the resulting signals received from the receiver electrodes of the touch sensor 908. In other words, there is a detectable difference in noise between the open state and the closed state of the portable computing device 900 such that the receiver electrodes of the touch sensor 908 are able to detect the state of the device 900.

Figure 10:
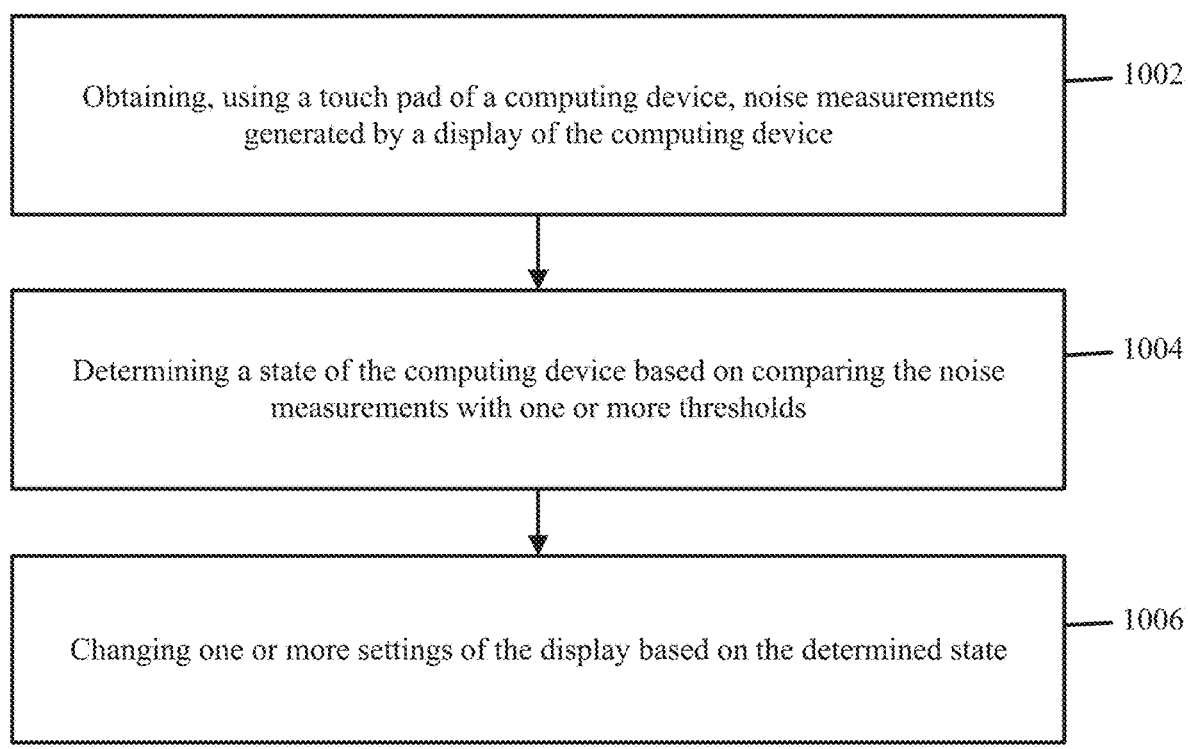
FIG. 10 is a flowchart of an exemplary process for using the touch sensor to determine a state of the foldable device according to one or more examples of the present application.

FIG. 10 is a flowchart of an exemplary process for using the touch sensor to determine a state of the foldable device according to one or more examples of the present application. Regarding this process, the processing system 110 is seeking to detect the noise of the display device 902. For instance, the processing system 110 may use a frequency sweep (e.g., mixer input is swept) to determine the frequency with the highest signal. The input panel (e.g., the touch sensor 908) may stay at this frequency to best detect the noise from the display device 902. In some instances, the portable computing device 900 (e.g., laptop) may have the screen/display 902 unsynchronized from the touchpad/touch sensor 908; however, the processing system 110 may still be able to detect the noise even if they are unsynchronized.

In particular, at block 1002, the processing system 110 obtains, using a touchpad (e.g., touch pad 908) of a computing device (e.g., portable computing device 900), noise measurements generated by a display (e.g., display device 902) of the computing device. For example, in operation, the display device 902 may generate noise. The touch pad 908 may include a noise detection sensor that is capable of detecting the noise from the display device 902.

At block 1004, the processing system 110 determines a state of the computing device based on comparing the noise measurements with one or more thresholds. For example, after obtaining the noise measurements from a noise detection sensor within the touch pad 908, the processing system 110 may compare the obtained noise measurements with one or more thresholds. For instance, one threshold may indicate whether the device 900 is in a closed state or an open state. Based on the noise measurements exceeding this threshold, the processing system 110 may determine the device 900 is in a closed state. Additionally, and/or alternatively, one or more other thresholds may indicate whether the device 900 is at a certain angle (e.g., 45 degrees). Based on comparing the noise measurements with the one or more other thresholds, the processing system 110 may determine the angle of the device 900.

At block 1006, the processing system 110 changes one or more settings of the display based on the determined state. For example, based on determining the device 900 is in a closed state, the processing system 110 may initiate a power saving mode for the display device 902 and/or the device 900.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A foldable device, comprising:
   a display device located in a first portion of the foldable device and configured to display information to a user, wherein the display device is not a touch screen and does not include any touch sensors;
   a touch sensor located in a second portion of the foldable device; and
   a processing system configured to:
      obtain, using the touch sensor located in the second portion of the foldable device, noise measurements generated by the display device located in the first portion of the foldable device, wherein the first portion and the second portion of the foldable device are separated by a foldable portion; and
      determine a state of the foldable device based on the noise measurements.

2. The foldable device of claim 1, wherein determining the state of the foldable device based on the noise measurements comprises:
   comparing the noise measurements with one or more thresholds; and
   based on the comparison, determining the state of the foldable device.

3. The foldable device of claim 2, wherein comparing the noise measurements with the one or more thresholds comprises comparing the noise measurements with a first threshold, and wherein determining the state of the foldable device based on the comparison comprises determining whether the foldable device is in a closed state or an open state based on whether the noise measurements exceed the first threshold.

4. The foldable device of claim 2, wherein comparing the noise measurements with the one or more thresholds comprises comparing the noise measurements with a plurality of thresholds, and wherein determining the state of the foldable device based on the comparison comprises determining an angle of the foldable device based on comparing the noise measurements with the plurality of thresholds.

5. The foldable device of claim 1, wherein the processing system is further configured to:
   change one or more settings of the display device based on the determined state of the foldable device.

6. The foldable device of claim 5, wherein changing the one or more settings of the display device comprises:
   initiating a power saving mode for the display device based on determining the foldable device is in a closed state.

7. The foldable device of claim 1, wherein the processing system is further configured to:
   use a frequency sweep to determine a frequency with a greatest magnitude signal associated with the noise measurements, and wherein determining the state of the foldable device based on the determined frequency.

8. The foldable device of claim 1, wherein the display device is unsynchronized from the touch sensor.

9. The foldable device of claim 1, wherein the touch sensor is a touch pad and comprises a noise detection sensor configured to detect the noise measurements generated by the display device.

10. The foldable device of claim 1, wherein the touch sensor comprises a plurality of receiver electrodes, wherein the plurality of receiver electrodes are configured to detect resulting signals from the display device, and wherein obtaining the noise measurements is based on the detected resulting signals from the display device.

11. The foldable device of claim 1, further comprising an input device.

12. A method comprising:
obtaining, by a processing system and using a touch sensor located in a second portion of a foldable device, noise measurements generated by a display device located in a first portion of the foldable device, wherein the foldable device comprises the display device, the touch sensor, and the processing system, wherein the first portion and the second portion of the foldable device are separated by a foldable portion, and wherein the display device is not a touch screen and does not include any touch sensors; and
determining, by the processing system, a state of the foldable device based on the noise measurements.

13. The method of claim 12, wherein determining the state of the foldable device based on the noise measurements comprises:
comparing the noise measurements with one or more thresholds; and
based on the comparison, determining the state of the foldable device.

14. The method of claim 13, wherein comparing the noise measurements with the one or more thresholds comprises comparing the noise measurements with a first threshold, and wherein determining the state of the foldable device based on the comparison comprises determining whether the foldable device is in a closed state or an open state based on whether the noise measurements exceed the first threshold.

15. The method of claim 13, wherein comparing the noise measurements with the one or more thresholds comprises comparing the noise measurements with a plurality of thresholds, and wherein determining the state of the foldable device based on the comparison comprises determining an angle of the foldable device based on comparing the noise measurements with the plurality of thresholds.

16. The method of claim 12, further comprising:
changing one or more settings of the display device based on the determined state of the foldable device.

17. The method of claim 16, wherein changing the one or more settings of the display device comprises:
initiating a power saving mode for the display device based on determining the foldable device is in a closed state.

18. The method of claim 12, further comprising:
using a frequency sweep to determine a frequency with a greatest magnitude signal associated with the noise measurements, and
wherein determining the state of the foldable device based on the determined frequency.

19. The method of claim 12, wherein the touch sensor comprises a plurality of receiver electrodes, wherein the plurality of receiver electrodes are configured to detect resulting signals from the display device, and wherein obtaining the noise measurements is based on the detected resulting signals from the display device.

20. A non-transitory computer-readable medium having processor-executable instructions stored thereon, the processor-executable instructions, when executed, facilitating performance of the following:
obtaining, using a touch sensor located in a second portion of a foldable device, noise measurements generated by a display device located in a first portion of the foldable device, wherein the foldable device comprises the display device and the touch sensor, wherein the first portion and the second portion of the foldable device are separated by a foldable portion, and wherein the display device is not a touch screen and does not include any touch sensors; and
determining a state of the foldable device based on the noise measurements.

* * * * *